United States Patent [19]
Giardini

[11] Patent Number: 4,968,921
[45] Date of Patent: Nov. 6, 1990

[54] ELECTROMAGNETIC MOTOR WITH SECONDARY STATOR COILS

[75] Inventor: Dante S. Giardini, Dearborn Heights, Mich.

[73] Assignee: G & E Engineering Limited, Dearborn Heights, Mich.

[21] Appl. No.: 425,288

[22] Filed: Oct. 23, 1989

[51] Int. Cl.⁵ .......................................... H02K 29/00
[52] U.S. Cl. ...................................... 318/138; 318/254
[58] Field of Search .................... 318/138, 254, 439

[56] References Cited

U.S. PATENT DOCUMENTS

| | | | |
|---|---|---|---|
| 2,704,334 | 3/1955 | Brailsford | 318/254 X |
| 3,264,539 | 8/1966 | Sander | 318/254 X |
| 3,720,864 | 3/1973 | Kolhagen | 318/138 |
| 3,956,678 | 5/1976 | Byrne et al. | |

FOREIGN PATENT DOCUMENTS

| | | | |
|---|---|---|---|
| 57-16598 | 1/1982 | Japan | 318/254 |
| 61-52182 | 3/1986 | Japan | 318/254 |
| 61-280750 | 12/1986 | Japan | 318/254 |
| 1228193 | 4/1986 | U.S.S.R. | 318/254 |

Primary Examiner—Bentsu Ro
Attorney, Agent, or Firm—Barnes, Kisselle, Raisch, Choate, Whittemore & Hulbert

[57] ABSTRACT

An electromagnetic motor includes a stator assembly having a stator body with at least one pole, a primary coil associated with the stator body and electrically interconnected with a power supply such that electric current is the primary coil creates a magnetic field in the pole, a secondary coil associated with the stator body and magnetically coupled with the body and primary coil, and a permanent magnet armature positioned so that there is a working air gap between the armature and the pole. Termination of current flow to the primary coil results in a collapsing magnetic field that induces an electric current in the secondary coil to reverse the magnetic polarity at the stator pole, and thereby reverse magnetic attractive propulsion force in the armature.

4 Claims, 2 Drawing Sheets

ELECTROMAGNETIC MOTOR WITH SECONDARY STATOR COILS

The present invention relates to electromagnetic motors, and more particularly to an electromagnetic motor construction having a permanent magnet armature and a stator with both primary and secondary coils.

BACKGROUND AND SUMMARY OF THE INVENTION

Conventional dc electromagnetic motors are energized by application of electrical current to stator coils, which creates a magnetic field that forces an armature to move from a rest position. When the current to the primary coils of the electromagnetic motor is terminated, a collapsing magnetic field is momentarily created. Where it is desired to return the armature to its original position after the electric current is terminated, a mechanical spring may be utilized for such a purpose. In any event, energy of the collapsing field is essentially wasted.

It is an object of this invention to provide an electromagnetic motor that employs the collapsing field caused by termination of stator coil current to move the armature to another position. It is a further object to provide electromagnetic motors that are of relatively simple and economical design, manufacture and assembly.

An electromagnetic motor in accordance with preferred embodiments of the present invention includes a stator assembly having a stator body with at least one pole, a primary coil associated with the stator body and electrically interconnected with a power supply such that electric current in the primary coil creates a magnetic field in the pole, a secondary coil associated with the stator body and magnetically coupled with the body and primary coil, and a permanent magnet armature positioned so that there is a working air gap between the armature and the pole. In accordance with one important aspect of the invention, termination of current flow to the primary coil results in a collapsing magnetic field that induces an electric current in the secondary coil to reverse the magnetic polarity at the stator pole, and thereby reverse magnetic attractive/propulsion force on the armature. An important advantage is that the armature is positively moved by magnetic forces when current is terminated in the primary coil, resulting in a more efficient motor while reducing or eliminating any need for a return spring.

The stator assembly in one embodiment of the invention comprises first and second stator bodies that are in spaced mirror symmetrical relationship. The first stator body has a pair of poles aligned with a pair of poles of the second stator body, and first and second primary coils are respectively disposed on the stator bodies. First and second secondary coils are respectively disposed on the stator bodies and electromagnetically coupled to the associated stator bodies and primary coils, and a rectifier is electrically connected to each secondary coil. When the electric current is terminated to the primary coils, a consequent collapsing magnetic field induces an electric current in the secondary coils, and this current is directed by the rectifier to reverse the polarities on the stator poles, which results in moving the armature to another position. This reduces the energy needed to move the armature to the opposite position.

The stator assembly in a second embodiment of the invention includes an annular stator body having four orthogonally spaced poles. Four primary coils are disposed around respective poles, and four secondary coils are disposed around respective poles and electromagnetically coupled to the stator body and the associated primary coils. Each secondary coil is connected to a rectifier to direct the induced electric current in a direction to reverse the polarity in the pole on which the secondary coil is disposed. In this second embodiment, when the current is terminated to a primary coil, the consequent collapsing magnetic field induces an current in the associated secondary coil that reverses the polarity in the respective pole and provides added energy to assist in moving the armature.

Other objects and features of the invention will become apparent in the following description and claims, in which the invention is described together with details to enable persons skilled in the art to practice the same, all in connection with the best modes presently contemplated for practicing the invention.

BRIEF DESCRIPTION OF THE DRAWINGS

Drawings accompanying the disclosure, and the various views thereof may be briefly described as follows.

DETAILED DESCRIPTION OF PREFERRED EMBODIMENTS

Figure 1:
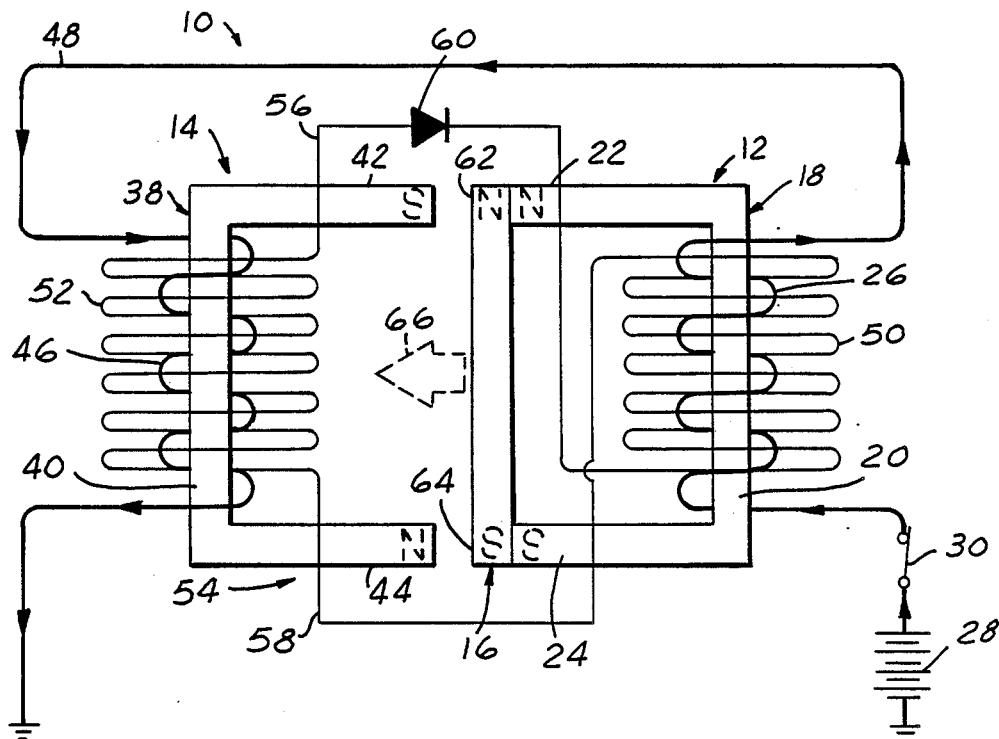
FIG. 1 is a schematic diagram that illustrates an embodiment of the invention having current applied thereto from an external source through a closed switch.
Figure 2:
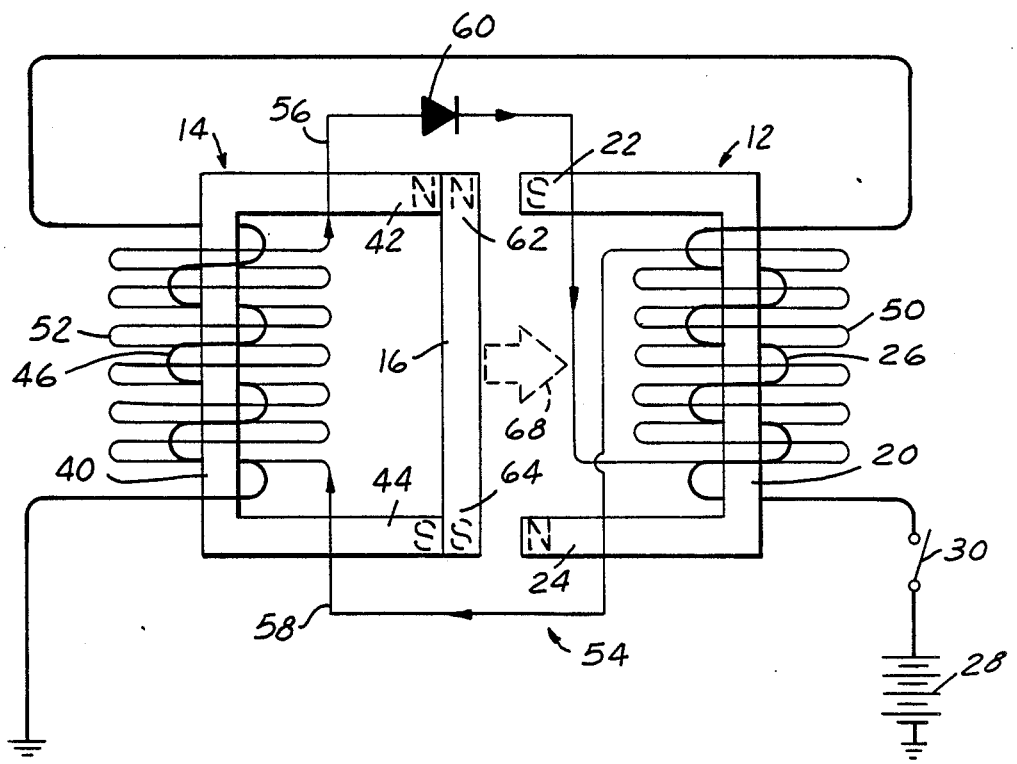
FIG. 2 is a schematic diagram that illustrates the embodiment of FIG. 1 with external current interrupted.

FIGS. 1 and 2 illustrate an electromagnetic motor 10 in accordance with a first embodiment of the present invention. Motor 10 comprises first and second stator assemblies 12, 14 with an armature 16 movably positioned therebetween. Stator assembly 12 comprises a one-piece stator body 18 of magnetically permeable construction having a base 20 with at least one pair of poles 22, 24 projecting therefrom. A primary electrical coil 26 is positioned between the pole pair 22, 24. Coil 26 is connected to a battery 28 by a switch 30, and is wound around base 20. Stator assembly 14 is identical to stator assembly 12 and spaced from stator assembly 12 in mirror symmetrical relationship. Stator assembly 14 includes a stator body 38 having a base 40 with a pair of poles 42, 44. Preferably, pole 42 is aligned with pole 22 and pole 44 is aligned with pole 24. Around base 40 is a primary coil 46, which is wound in opposite spiral direction to primary coil 26. Therefore, if primary coil 26 is wound clockwise around base 20, primary coil 46 is wound counterclockwise on base 40. The coils 26, 46 are interconnected at adjacent ends by a conductor 48.

Each stator assembly 12, 14 also has a secondary coil 50, 52. Secondary coil 50 is wound around base 20, and is thereby electromagnetically coupled to body 18 and primary coil 26. Secondary coil 52 is wound around base 40, and is thereby electromagnetically coupled to body 38 and primary coil 46. The secondary coils 50, 52 each have a higher number of turns than do the associated primary coils 26, 46, and are wound in opposite spiral direction to associated stator coils 26, 46. Preferably, each secondary coil's windings axially overlap the windings of the associated primary coil. Opposite ends of secondary coils 50 and 52 are connected by two associated conductors 56, 58 to make a complete secondary coil circuit 54. A rectifier 60 is interposed in conductor 56 to permit induced current to flow in only one direction through the secondary coil circuit 54.

Armature 16 is of permanent magnetic construction, having ends 62, 64 of opposite magnetic polarity as illustrated in phantom. Ends 62, 64 are positioned between pairs of aligned poles 22, 42 and 24, 44 of stator assemblies 12 and 14. Both stator assemblies 12, 14 are mounted so that there is an air gap between projecting poles 22, 24 of body 18, or projecting poles 42, 44 of body 38, and armature 16. This mounting allows for limited travel of the armature 16 between stator assemblies 12, 14.

Operation of electromagnetic motor 10 is illustrated in FIGS. 1 and 2. Initially, armature 16 is in abutting engagement with stator assembly 12 and is held thereagainst by magnetic attraction between armature ends 62, 64 and respective poles 22, 24 in absence of current through the primary coils. When switch 28 is closed to allow electric current to flow in the direction illustrated in FIG. 1 through primary coils 26, 46, this current creates a magnetic field that causes poles 22, 24 to have the same magnetic polarity as the adjacent ends 62, 64 of armature 16, and at the same time generates a magnetic field that creates opposite polarities in poles 42, 44 to those of the magnetic ends 62, 64 and aligned poles 22, 24. That is, poles 22, 24 of stator body 18 are of "north" and "south" polarities, as are ends 62, 64, while poles 42, 44 of stator assembly 14 are of "south" and "north" polarities. Thus, armature 16 is simultaneously magnetically attracted to stator assembly 14 and repelled by stator assembly 12 in the direction 66. Armature 16 is thereby moved from right to left in FIG. 1, and held in abutment with stator assembly 14 until current is interrupted or terminated to stator coils 26, 46.

When current is interrupted or terminated to coils 26, 46 by opening switch 28 (FIG. 2), consequent collapsing magnetic fields in coils 26, 46 induce a current in secondary coil circuit 54. This induced current causes the polarities in the poles 22, 24 and 42, 44 to reverse, which moves armature 16 in the direction 68 back toward its original starting position. Poles 22, 24 attract ends 62, 64 of armature 16, and poles 42, 44 repel ends 62, 64 of armature 16. This secondary coil circuit thus supplements or replaces a mechanical spring for returning the armature to its original position.

Figure 3:
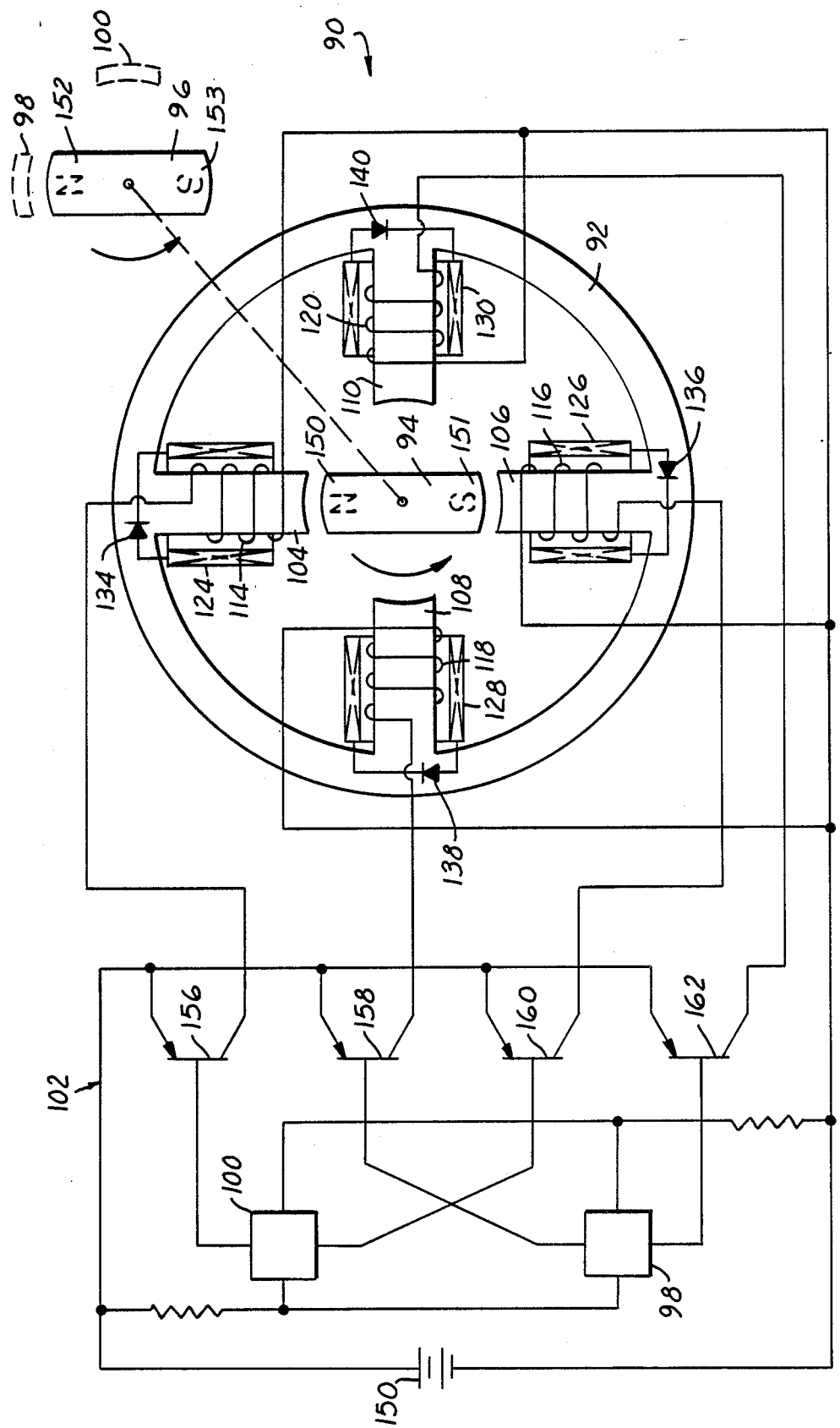
FIG. 3 is a schematic diagram that illustrates a second embodiment of the invention.

FIG. 3 illustrates a second embodiment 90 of an electromagnetic motor in accordance with the invention. This embodiment 90 comprises a stator body 92, an armature 94 that is mechanically connected to a permanent magnet 96 having a pair of adjacent hall elements 98, 100, and an electric switch circuit 102. Stator body 92 is of annular magnetic construction, having integral radially inwardly projecting orthogonally spaced poles 104, 106, 108, 110. The first pair of poles 104, 106 are in mirror symmetrical relationship with their ends aligned with each other, and the second pair of poles 108, 110 are in mirror symmetrical relationship with their ends aligned with each other and perpendicular to the first pair of poles 104, 106. Respectively disposed around each pole is a primary coil 114, 116, 118, 120. All primary coils are interconnected to the electric switch circuit 102. Also respectively disposed around each pole adjacent to the associated primary coil are secondary coils 124, 126, 128, 130. Interposed in each secondary coil is a rectifier 134, 136, 138, 140 for preventing induced current from heating up the secondary coil while electric current flows through the adjacent primary coil.

Armature 94 is mounted for rotation within stator body 92 and is positioned so that its radially polarized ends 150, 154 are spaced from the ends of the poles 104, 106, 108, 110, which are concentric with the axis of armature rotation. As the armature 94 rotates through 360°, magnet 96 travels through the same rotational movement. Hall element 98 is positioned adjacent to one polarized end 152 of magnet 96 when armature 94 is in alignment with poles 104, 106 and end 150 is adjacent pole 104. As shown in FIG. 3, when armature 94 has end 150 with a "north" polarity adjacent to pole 104, magnet 96 has an end 152 with a "north" polarity adjacent to hall element 98. Hall element 100 is positioned 90° from hall element 98, preferably clockwise, so that when armature 94 has rotated counterclockwise 90° and has end 151 adjacent to pole 110, member 96 has end 153 adjacent to hall element 100. These hall elements 98, 100 work together with electric switch circuit 102 to energize the poles of the stator body 92 to magnetically repel and/or attract ends 151, 152 of armature 94, resulting in rotation of armature 94. Electric switch circuit 102 comprises a power supply 150, hall elements 98, 100 and four transistors 156, 158, 160, 162. All of the elements of the electric switch circuit 102 are electrically interconnected and provide current to at least one pole on the stator body 92.

In operation, if hall element 98 detects the "north" polarity of the adjacent end 150 of magnetic element 96, hall element 98 generates an electromotive force that turns on transistor 158 to supply current to primary coil 118 to create a south polarity on pole 108. At the same time, when armature end 152 leaves proximity of hall element 100, element 100 terminates current to primary coil 114. This termination results in a collapsing magnetic field which induces a current in the adjacent secondary coil 124 that reverses the polarity of pole 104. This effect causes a repelling force between end 150 and pole 104 to combine with the attraction force between pole 106 and end 150 and continue counterclockwise rotation of armature 94 and mechanically connected member 96.

This rotation results in magnet 96 having its "south" polarized end 153 brought to a position adjacent to hall element 100. This generates an output in hall element 100 that turns on transistor 160 and supplies current to primary coil 116, which causes pole 106 to have a "south" polarity thereby attracting end 150. Also, because no end of magnet 96 is adjacent to hall element 98, output voltage of hall element 98 is terminated. This interrupts current to primary coil 118, resulting in a collapsing magnetic field that induces a current in secondary coil 128 and reverses the polarity in pole 108 to a "north" polarity to repel end 150 of armature 94. Again, armature 94 and magnet 96 are rotated counterclockwise resulting in the "south" polarity end 153 being adjacent to hall element 98 and thereby generating an output in hall element 98 that turns on transistor 162 and directs current to the primary coil 120 that causes a "south" polarity on pole 110. Pole 110 attracts end 150 to rotate armature 94 another 90° counterclockwise. Concurrently, electric current is terminated to primary coil 116, resulting in a collapsing magnetic field and induced current in secondary coil 126. The secondary coil 126 reverses the polarity of pole 106 and repels end 150.

This continuous switching of the electric current to an adjacent primary coil, and simultaneous termination of electric current to the preceding primary coil, causes the armature to rotate based not on just the attractive force of the adjacent pole but also on the repelling force of the preceding pole. This motor utilizes the energy of the collapsing magnetic field not previously harnessed, and results in a more efficient electric motor.

It is also to be understood that, while the foregoing description and drawings illustrate in detail several embodiments of the invention, to those skilled in the art to which the present invention relates, the present disclosure will suggest many modifications in construction, as well as widely differing embodiments and applications, without thereby departing from the spirit and scope of the invention. The present invention therefore is intended to be limited only by the scope of the appended claims and applicable prior art.

I claim:

1. An electromagnetic motor that comprises: a permanent magnet armature having spaced zones of differing magnetic polarity; stator means including a stator body of magnetically permeable construction having at least one pole, said armature being mounted for movement in a predetermined direction adjacent to said pole; electronic switch means coupled to a source of electric power; primary coil means carried by said stator body and coupled to said switch means for inducing a primary magnetic field of predetermined polarity in said stator pole upon closure of said switch means; and secondary coil means carried by said stator body and responsive to collapse of said primary magnetic field upon opening of said switch means to induce a secondary magnetic field in said pole of polarity opposite to said predetermined polarity of said primary magnetic field, such that said magnetic zones on said permanent magnet armature are alternately attracted to and repelled by said stator pole upon opening and closure of said switch means, said secondary coil means comprising a coil having a pair of coil ends, and unidirectional current conducting means connected in series between said secondary coil ends for preventing flow of current through said secondary coil means upon closure of said switch means and buildup of said primary magnetic field while enabling flow of current through said secondary coil means upon opening of said switch means and the collapse of said primary magnetic field, said secondary coil means being free of electrical connection to other circuit means such that substantially all energy generated in said second coil means by said collapsing primary magnetic field is returned to said pole through said secondary magnetic field.

2. The motor set forth in claim 1 wherein said stator means includes at least two poles spaced from each other in said predetermined direction of movement of said armature; wherein said primary coil means includes first and second primary coils coupled to said switch means for inducing first and second primary magnetic fields of respectively opposite polarity in said two poles; and wherein said secondary coil means includes first and second secondary coils respectively coupled to said two poles with associated first and second unidirectional current conducting means responsive to the collapse of said first and second primary magnetic fields induced by said first and second primary coils for inducing first and second secondary magnetic fields in said two poles of polarities respectively opposite to said first and second primary magnetic fields.

3. The motor set forth in claim 1 wherein said secondary coil means has a greater number of coil turns than does said primary coil means.

4. The motor set forth in claim 1 further comprising means for periodically opening and closing said switch means to obtain substantially continuous movement at said armature.

* * * * *